(12) United States Patent
Iwahori et al.

(10) Patent No.: US 12,736,985 B2
(45) Date of Patent: Sep. 15, 2026

(54) MONITORING DEVICE

(71) Applicant: TOYOTA JIDOSHA KABUSHIKI KAISHA, Toyota (JP)

(72) Inventors: Kento Iwahori, Nagoya (JP); Noritsugu Iwazaki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/934,666

(22) Filed: Nov. 1, 2024

(65) Prior Publication Data

US 2025/0189987 A1 Jun. 12, 2025

(30) Foreign Application Priority Data

Dec. 7, 2023 (JP) ................................ 2023-206846

(51) Int. Cl.

*G05D 1/65* (2024.01)
*G05D 1/249* (2024.01)
*G05D 107/70* (2024.01)
*G05D 109/10* (2024.01)
*G05D 111/50* (2024.01)

(52) U.S. Cl.

CPC ............... *G05D 1/65* (2024.01); *G05D 1/249* (2024.01); *G05D 2107/70* (2024.01); *G05D 2109/10* (2024.01); *G05D 2111/52* (2024.01)

(58) Field of Classification Search

CPC ...... G05D 1/65; G05D 1/249; G05D 2107/70; G05D 2109/10; G05D 2111/52; B60W 2510/081; B60W 2520/28; B60W 40/105; G01P 3/481; G01P 3/50; B60R 16/023; G01D 21/02; H04L 67/12; H04Q 9/00

USPC ........................................................... 701/23

See application file for complete search history.

(56) References Cited

U.S. PATENT DOCUMENTS

2017/0320529 A1 11/2017 Nordbruch
2021/0101584 A1* 4/2021 Cho ...................... B60W 40/10
2021/0237585 A1 8/2021 Miura
2023/0192116 A1* 6/2023 Edwards ............ B60W 60/001 701/23
2023/0286517 A1* 9/2023 Cao ......................... B60L 15/20
2024/0383457 A1* 11/2024 Xia .................. B60W 50/0225

FOREIGN PATENT DOCUMENTS

JP 2017-538619 A 12/2017
JP 2021-125887 A 8/2021

* cited by examiner

*Primary Examiner* — Andrew R Dyer
(74) *Attorney, Agent, or Firm* — Oliff PLC

(57) ABSTRACT

A monitoring device monitors a vehicle that travels through unattended operation using an electric motor as a power source, and includes: a selection unit that selects which one of a first method and a second method is used to acquire a speed of the vehicle according to a status about the speed of the vehicle, the first method being a method of acquiring a speed of the vehicle using a detection value from a vehicle speed sensor that makes an output in synchronization with rotation of a wheel of the vehicle, and the second method being a method of acquiring a speed of the vehicle using information about a rotational speed of the electric motor provided in the vehicle; and a speed acquisition unit that acquires a speed of the vehicle using the method selected by the selection unit.

8 Claims, 7 Drawing Sheets

50
200
PL1
PL2
PL3
FC
GC
X
Y
Z
100
100
300
300
300
300
300
300
TR
TR
RR

SERVER
START
S1
ACQUIRE VEHICLE POSITION INFORMATION USING DETECTION RESULT FROM EXTERNAL SENSOR
S2
DETERMINE NEXT TARGET POSITION
S3
GENERATE TRAVEL CONTROL SIGNAL
S4
TRANSMIT TRAVEL CONTROL SIGNAL TO VEHICLE
END
VEHICLE
START
S5
RECEIVE TRAVEL CONTROL SIGNAL FROM SERVER
S6
CONTROL ACTUATORS USING TRAVEL CONTROL SIGNAL
END

SERVER
START
S11
ACQUIRE PRESENT POSITION
S12
ACQUIRE INFORMATION ON TARGET SPEED
S13
SELECT METHOD OF ACQUIRING SPEED
S14
IS FIRST METHOD SELECTED?
NO
YES
S15
ACQUIRE SPEED BY FIRST METHOD
S16
ACQUIRE SPEED BY SECOND METHOD
S17
IS FINAL DESTINATION LOCATION REACHED?
NO
YES
END

VEHICLE
START
S211
ACQUIRE PRESENT POSITION
S212
ACQUIRE INFORMATION ON TARGET SPEED
S213
SELECT METHOD OF ACQUIRING SPEED
S214
IS FIRST METHOD SELECTED?
NO
YES
S215
ACQUIRE SPEED BY FIRST METHOD
S216
ACQUIRE SPEED BY SECOND METHOD
S217
IS FINAL DESTINATION LOCATION REACHED?
NO
YES
END

MONITORING DEVICE

CROSS-REFERENCE TO RELATED APPLICATION

This application claims priority to Japanese Patent Application No. 2023-206846 filed on Dec. 7, 2023, incorporated herein by reference in its entirety.

BACKGROUND

1. Technical Field

The present disclosure relates to a monitoring device.

2. Description of Related Art

Japanese Unexamined Patent Application Publication (Translation of PCT Application) No. 2017-538619 (JP 2017-538619 A) describes a vehicle that is manufactured in a manufacturing process of manufacturing vehicles and that travels through remote operation or autonomously.

SUMMARY

In the manufacturing process, an unfinished vehicle is occasionally caused to travel to be moved between processes without using a conveyor. The unfinished vehicle travels at a significantly low speed according to the conveyance speed of a conveyor. The inventors have discovered that the reliability of a detection value from a vehicle speed sensor is low when the travel speed of a vehicle is significantly low. Therefore, there has been a demand for a technique of appropriately detecting the speed of a vehicle even when the vehicle is traveling at a low speed according to the conveyance speed of a conveyor.

The present disclosure can be implemented as the following aspects.

(1) A first aspect of the present disclosure provides a monitoring device. This monitoring device is a monitoring device configured to monitor a vehicle that travels through unattended operation using an electric motor as a power source, including: a selection unit configured to select which one of a first method and a second method is used to acquire a speed of the vehicle according to a status about the speed of the vehicle, the first method being a method of acquiring the speed of the vehicle using a detection value from a vehicle speed sensor that makes an output in synchronization with rotation of a wheel of the vehicle, and the second method being a method of acquiring the speed of the vehicle using information about a rotational speed of the electric motor provided in the vehicle; and a speed acquisition unit configured to acquire the speed of the vehicle using the first method or the second method selected by the selection unit.

According to this aspect, it is selected according to the status about the vehicle speed which of the detection value from the vehicle speed sensor and the information about the rotational speed of the electric motor is used in order to acquire the vehicle speed, and therefore the vehicle speed can be appropriately detected both when the vehicle is traveling at a low speed and when the vehicle is not traveling at a low speed.

(2) In the monitoring device according to the above aspect, the selection unit may be configured to: select the first method when a predetermined condition indicating that a reliability degree of the detection value from the vehicle speed sensor is equal to or higher than a predetermined value is met; and select the second method when the predetermined condition is not met.

According to this aspect, the vehicle speed is acquired using the detection value from the vehicle speed sensor when the reliability degree of the detection value from the vehicle speed sensor is equal to or higher than the predetermined value, and the vehicle speed is acquired using the information about the rotational speed of the electric motor when the reliability degree of the detection value from the vehicle speed sensor is not higher than the predetermined value. Therefore, the reliability degree of the detection of the vehicle speed can be secured both when the vehicle is traveling at a low speed and when the vehicle is not traveling at a low speed.

(3) In the monitoring device according to the above aspect, the predetermined condition may involve indicating that the detection value from the vehicle speed sensor is equal to or more than a predetermined speed.

According to this aspect, as the vehicle speed is higher, the reliability degree of the detection value from the vehicle speed sensor tends to be higher, and therefore the vehicle speed can be detected more appropriately.

(4) In the monitoring device according to the above aspect, the vehicle may be configured to travel in a factory in which a plurality of processes is executed in order to manufacture the vehicle; and the predetermined condition may involve a travel speed of the vehicle being not limited in a present process of the vehicle.

According to this aspect, when the travel speed of the vehicle that travels in the factory is limited in a specific process, the vehicle travels at a low speed, and therefore the vehicle speed is acquired using the information about the rotational speed of the electric motor. Therefore, the vehicle speed can be detected appropriately also when the vehicle is traveling at a low speed.

(5) In the monitoring device according to the above aspect, when the first method is selected, a control value for controlling the unattended operation of the vehicle may include at least a target value for acceleration of the vehicle.

(6) In the monitoring device according to the above aspect, when the second method is selected, a control value for controlling the unattended operation of the vehicle may include at least a target value for the speed of the vehicle.

According to this aspect, acceleration in the front-rear direction and acceleration in the right-left direction are applied to the vehicle by disturbances due to the travel environment of the vehicle. When the vehicle speed is equal to or more than a predetermined speed, variations in the acceleration in the front-rear direction and the acceleration in the right-left direction tend to be large. Therefore, travel of the vehicle may be made unstable by the variations in the acceleration in the front-rear direction and the acceleration in the right-left direction. Hence, travel of the vehicle can be finely controlled by controlling the acceleration of the vehicle.

(7) The monitoring device according to the above aspect may further include a communication device that regularly receives the detection value from the vehicle speed sensor and the rotational speed of the electric motor from the vehicle.

(8) The monitoring device of the above aspect may further include a position estimation unit configured to estimate a position of the vehicle using a detection result output from an external sensor that is positioned outside the vehicle and that images the vehicle.

The present disclosure can be implemented in a variety of forms, and can be implemented in the form of a remote operation system, a mobile body control device, a remote automatic driving method, a method of manufacturing a mobile body, etc., for example.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
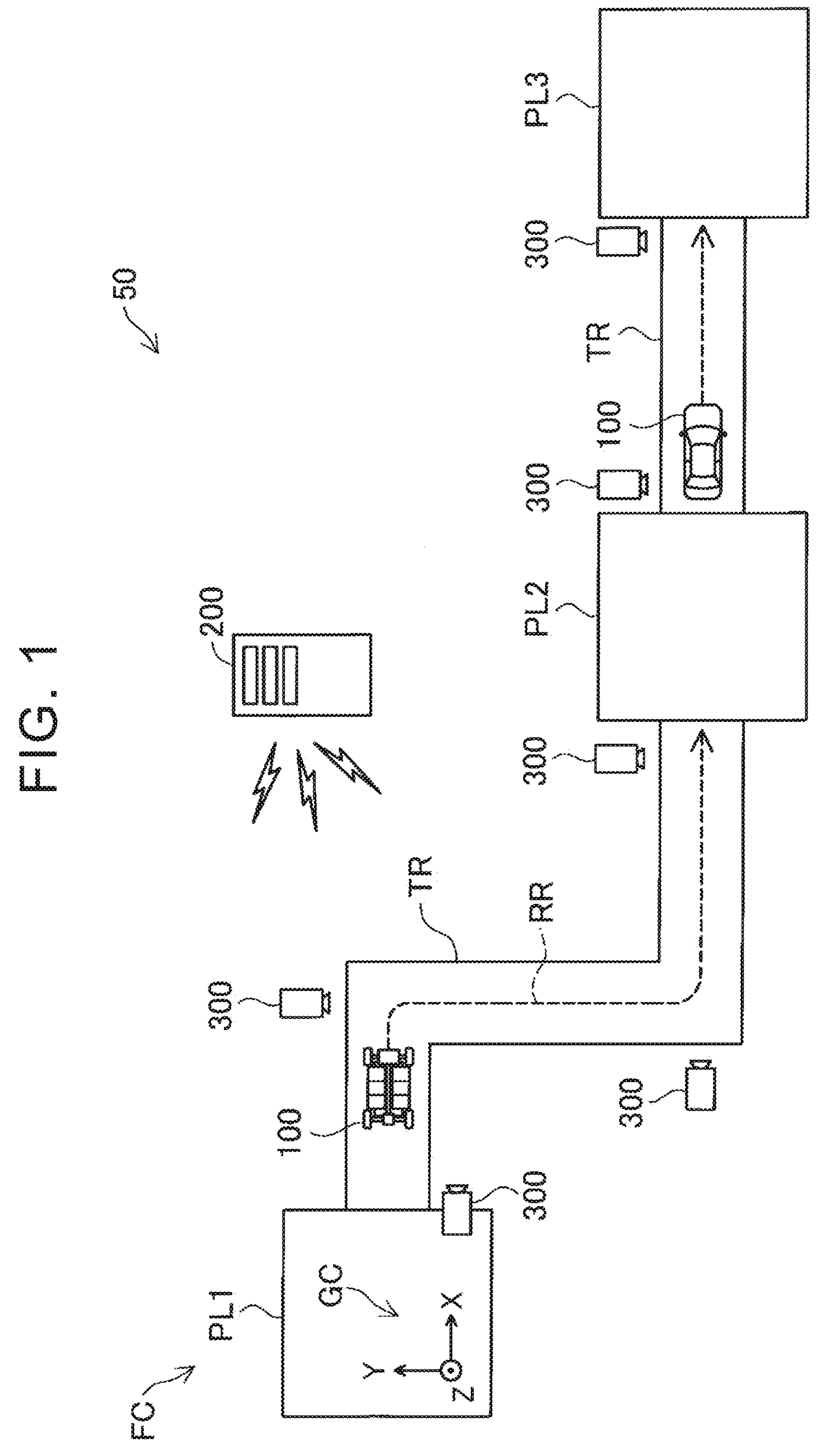
FIG. 1 is a conceptual diagram illustrating the configuration of a system according to a first embodiment.

FIG. 1 is a conceptual diagram illustrating the configuration of a system 50 according to a first embodiment. The system 50 is used in a factory FC where vehicles 100 are manufactured. The vehicles 100 are each a battery electric vehicle (BEV). The vehicle 100 travels using an electric motor as a power source. The vehicle 100 is the subject of a plurality of processes executed in the factory FC. The system 50 includes one or more vehicles 100 as mobile bodies, a server 200, and a plurality of external sensors 300. The server 200 is also called a "monitoring device". The external sensors 300 are each a camera that captures the vehicle 100. In the present disclosure, the term "mobile body" means a movable object, and may be a vehicle or an electric vertical take-off and landing aircraft (a so-called flying vehicle), for example. The vehicle may be a vehicle that travels using wheels or a vehicle that travels using an endless track, and may be a passenger vehicle, a truck, a bus, a two-wheeled vehicle, a four-wheeled vehicle, a tank, a construction vehicle, etc., for example. The vehicle includes a battery electric vehicle (BEV), a gasoline vehicle, a hybrid electric vehicle, and a fuel cell electric vehicle. When the mobile body is not a vehicle, the expressions "vehicle" and "car" as used herein may be replaced with "mobile body" as appropriate, and the expression "travel" may be replaced with "move" as appropriate.

The vehicle 100 can travel through unattended operation. The term "unattended operation" means operation not based on travel operations by an occupant. The travel operations mean operations related to at least one of "traveling", "turning", and "stopping" of the vehicle 100. The unattended operation is achieved through automatic or manual remote control performed using a device positioned outside the vehicle 100 or through autonomous control of the vehicle 100. An occupant that does not perform the travel operations may be on board the vehicle 100 that travels through the unattended operation. Examples of the occupant that does not perform the travel operations include a person simply seated on a seat of the vehicle 100 and a person that performs work different from the travel operations, such as assembly, inspection, and operation of switches, while being on board the vehicle 100. Operation based on the travel operations by an occupant is occasionally called "attended operation".

Herein, the term "remote control" includes "full remote control" in which all of the operation of the vehicle 100 is fully determined from the outside of the vehicle 100, and "partial remote control" in which a part of the operation of the vehicle 100 is determined from the outside of the vehicle 100. Meanwhile, the term "autonomous control" includes "full autonomous control" in which the vehicle 100 autonomously controls its operation without receiving any information from devices outside the vehicle 100, and "partial autonomous control" in which the vehicle 100 autonomously controls its operation using information received from devices outside the vehicle 100.

The vehicle 100 is being manufactured, and travels through unattended operation in the factory FC where vehicles 100 are manufactured. The standard coordinate system of the factory FC is a global coordinate system GC. That is, any position in the factory FC is represented by X, Y, and Z coordinates in the global coordinate system GC. The factory FC includes a first location PL1, a second location PL2, and a third location PL3. The first location PL1, the second location PL2, and the third location PL3 are connected by a travel path TR along which the vehicle 100 can travel. The external sensors 300 are installed along the travel path TR in the factory FC. The respective positions of the external sensors 300 in the factory FC are adjusted in advance. The vehicle 100 travels from the first location PL1 to the second location PL2 through the travel path TR through unattended operation. Further, the vehicle 100 travels from the second location PL2 to the third location PL3 through the travel path TR.

The first location PL1 is a location at which the work of assembling the vehicle 100 is performed. For example, the work of assembling parts is performed by an assembly robot (not illustrated) at the first location PL1. The vehicle 100 which has been assembled at the first location PL1 is in the state of being able to travel through unattended operation, or in other words, in the state of being able to implement three functions, namely "traveling", "turning", and "stopping", through unattended operation. In the present embodiment, the vehicle 100 which has been assembled at the first location PL1 travels in the form of a platform that includes components to be discussed below from the first location PL1 to the second location PL2 through unattended operation. Specifically, it is only necessary that the vehicle 100 should include at least a vehicle control device 110 and an actuator group 120 in order to implement the three functions, namely "traveling", "turning", and "stopping", through unattended operation. When the vehicle 100 acquires information from the outside in order for unattended operation, the vehicle 100 may further include a communication device 130. That is, at least a part of interior parts such as a driver's seat or a dashboard may not be mounted to the vehicle 100 that is movable through unattended operation, at least a part of exterior parts such as a bumper or a fender may not be mounted to the vehicle 100, or a body shell may not be mounted to the vehicle 100. In this case, the remaining parts such as a body shell may be mounted to the vehicle 100 before the vehicle 100 is shipped from the factory FC, or the remaining parts such as a body shell may be mounted the vehicle 100 after the vehicle 100 is shipped from the factory FC without the remaining parts such as a body shell mounted to the vehicle 100. The parts may be mounted to the vehicle 100 from any direction, such as the upper side, the lower side, the front side, the rear side, the right side, and the left side, and may be mounted from the same direction or from different directions.

Further parts are assembled to the vehicle 100 by an assembly robot (not illustrated) at the second location PL2. Vehicles bodies such as a body shell and a hood, interior parts such as a seat and a dashboard, and exterior parts such as a bumper and a fender are assembled to the vehicle 100 in the form of a platform by an assembly robot (not illustrated) at the second location PL2. Functional units are assembled at the third location PL3. Examples of the functional units include a plurality of electronic control units (ECUs).

Figure 2:
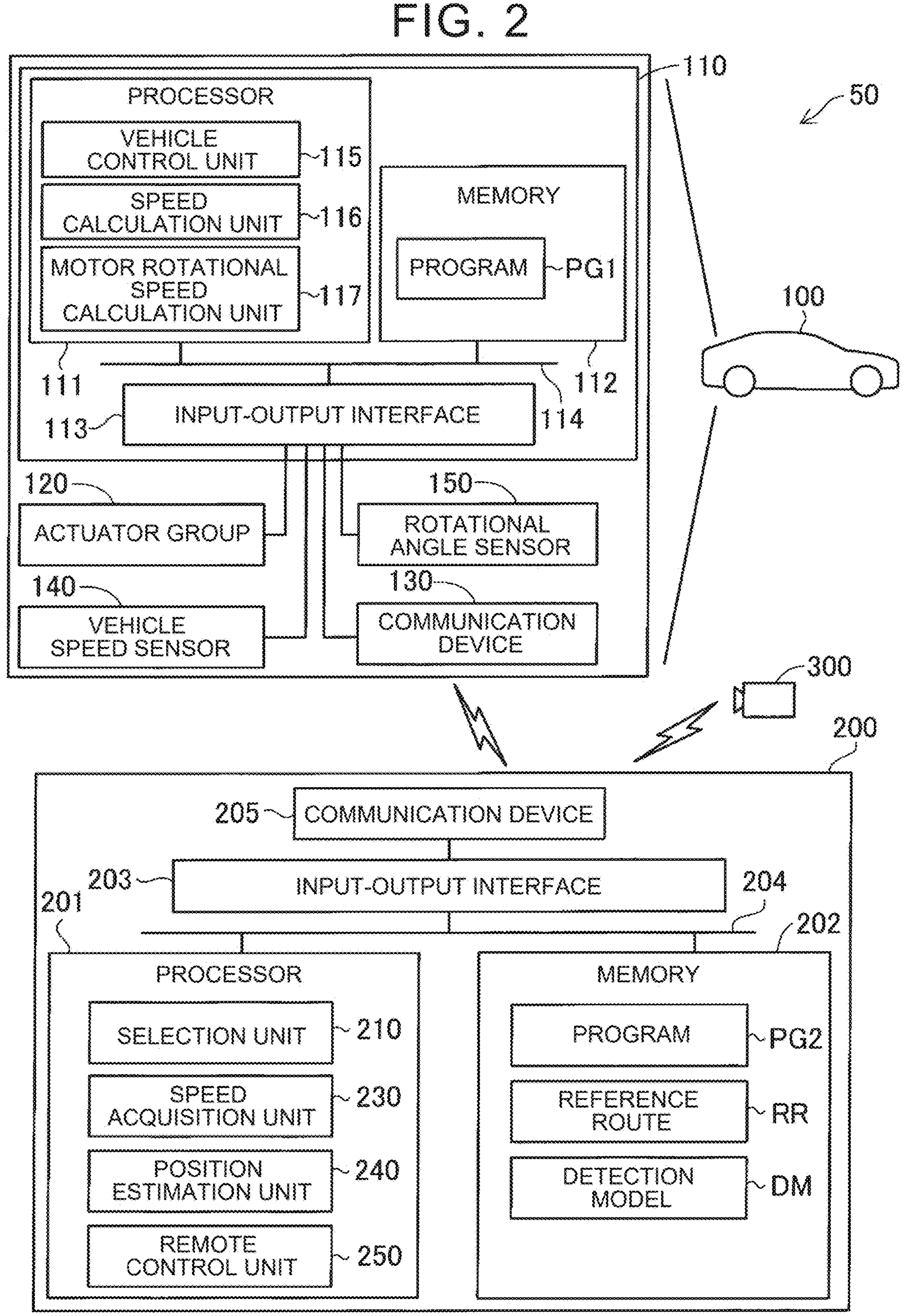
FIG. 2 is a block diagram illustrating a schematic configuration of the system.

FIG. 2 is a block diagram illustrating a schematic configuration of the system 50. The vehicle 100 includes a vehicle control device 110 that controls various portions of the vehicle 100, an actuator group 120 that includes one or more actuators that are driven under the control of the vehicle control device 110, a communication device 130 that communicates with external devices such as the server 200 through wireless communication, a vehicle speed sensor 140, and a rotational angle sensor 150. The actuator group 120 includes an actuator of a drive device that accelerates the vehicle 100, an actuator of a steering device that changes the advancing direction of the vehicle 100, and an actuator of a braking device that decelerates the vehicle 100.

The vehicle speed sensor 140 outputs pulse signals according to rotation of a rotary shaft of a wheel. The vehicle speed sensor 140 is a sensor that makes an output in synchronization with rotation of a wheel of the vehicle 100. The vehicle speed sensor 140 generates a pulse signal each time the rotary shaft of the wheel rotates by a set angle such as 90 degrees or 180 degrees. The pulse signals output from the vehicle speed sensor 140 are also referred to as “vehicle speed pulses” or a “vehicle speed signal”. The vehicle speed sensor 140 outputs the pulse signals to a processor 111.

The rotational angle sensor 150 detects the rotational angle of an output shaft of an electric motor (hereinafter referred to as a “drive motor”) that is an actuator that drives a drive shaft. The rotational angle sensor 150 may be a resolver, an encoder, etc. The rotational angle sensor 150 outputs a signal that represents the detected rotational angle to the processor 111.

The vehicle control device 110 is constituted by a computer that includes a processor 111, a memory 112, an input-output interface 113, and an internal bus 114. The processor 111, the memory 112, and the input-output interface 113 are connected so as to be bidirectionally communicable via the internal bus 114. The actuator group 120 and the communication device 130 are connected to the input-output interface 113. The processor 111 implements a variety of functions, including the functions of a vehicle control unit 115, a speed calculation unit 116, and a motor rotational speed calculation unit 117, by executing a program PG1 stored in the memory 112.

The vehicle control unit 115 can cause the vehicle 100 to travel by controlling the actuator group 120 using a travel control signal received from the server 200. The travel control signal is a control signal for causing the vehicle 100 to travel. In the present embodiment, the travel control signal includes the acceleration and the steering angle of the vehicle 100 as parameters. The travel control signal may include the speed of the vehicle 100 as a parameter in place of or in addition to the acceleration of the vehicle 100.

In addition, the vehicle control unit 115 regularly transmits a travel speed of the vehicle 100 calculated by the speed calculation unit 116 to be discussed later to the server 200. The vehicle control unit 115 regularly transmits a rotational speed of the output shaft of the drive motor calculated by the motor rotational speed calculation unit 117 to be discussed later to the server 200. That is, the server 200 regularly receives the calculated travel speed (vehicle speed) from the vehicle 100.

The speed calculation unit 116 calculates a travel speed of the vehicle 100 using the pulse signals received from the vehicle speed sensor 140.

The motor rotational speed calculation unit 117 calculates a rotational speed of the output shaft of the drive motor (rotational speed of the drive motor) using a signal that represents a rotational angle received from the rotational angle sensor 150. The server 200 regularly receives the calculated rotational speed of the output shaft of the drive motor from the vehicle 100.

The server 200 is constituted by a computer that includes a processor 201, a memory 202, an input-output interface 203, and an internal bus 204. The processor 201, the memory 202, and the input-output interface 203 are connected so as to be bidirectionally communicable via the internal bus 204. A communication device 205 that communicates with various devices outside the server 200 is connected to the input-output interface 203. The communication device 205 can communicate with the vehicle 100 through wireless communication, and can communicate with the external sensors 300 through wired communication or wireless communication.

The memory 202 stores in advance a reference route RR that indicates a route that should be traveled by the vehicle 100, a detection model DM to be discussed later, etc. The processor 201 implements a variety of functions, including the functions of a selection unit 210, a speed acquisition unit 230, a position estimation unit 240, and a remote control unit 250, by executing a program PG2 stored in the memory 202.

The selection unit 210 selects which one of a first method and a second method is used as a method of acquiring the speed of the vehicle 100. The first method is a method of acquiring the speed of the vehicle 100 using a detection value from the vehicle speed sensor 140. The second method is a method of acquiring the speed of the vehicle 100 using the rotational speed of the output shaft of the drive motor of the vehicle 100 as information about the rotational speed of the drive motor provided in the vehicle 100.

The speed acquisition unit 230 acquires a detection value from the vehicle speed sensor 140 (the travel speed of the vehicle 100 calculated by the speed calculation unit 116) or the rotational speed of the output shaft of the drive motor of the vehicle 100 according to the method selected by the selection unit 210.

The position estimation unit 240 estimates the position and the orientation of the vehicle 100 using a detection result output from the external sensor 300. Alternatively, the position estimation unit 240 may estimate only one of the position and the orientation of the vehicle 100 using the detection result output from the external sensor 300. In this case, the other of the position and the orientation of the vehicle 100 is determined using a travel history etc. of the vehicle 100, for example.

The remote control unit 250 causes the vehicle 100 to travel through remote control, by acquiring detection results from the sensors, generating a travel control signal for controlling the actuator group 120 of the vehicle 100 using the detection results, and transmitting the travel control signal to the vehicle 100. The remote control unit 250 may generate and output not only a travel control signal but also a control signal for controlling actuators that drive various auxiliary devices provided in the vehicle 100 and various types of equipment such as wipers, power windows, and lamps, for example. That is, the remote control unit 250 may cause such various types of equipment and various auxiliary devices to operate through remote control. Herein, the term "remote control" includes "full remote control" in which all of the operation of the vehicle 100 is fully determined from the outside of the vehicle 100, and "partial remote control" in which a part of the operation of the vehicle 100 is determined from the outside of the vehicle 100.

The external sensors 300 are sensors positioned outside the vehicle 100. The external sensors 300 are sensors that capture the vehicle 100 from the outside of the vehicle 100. The external sensors 300 include a communication device (not illustrated), and can communicate with other devices such as the server 200 through wired communication or wireless communication. Specifically, the external sensors 300 are constituted of cameras installed in the site of the factory. The camera as the external sensor 300 captures an image that includes the vehicle 100, and outputs the captured image as a detection result.

Figure 3:
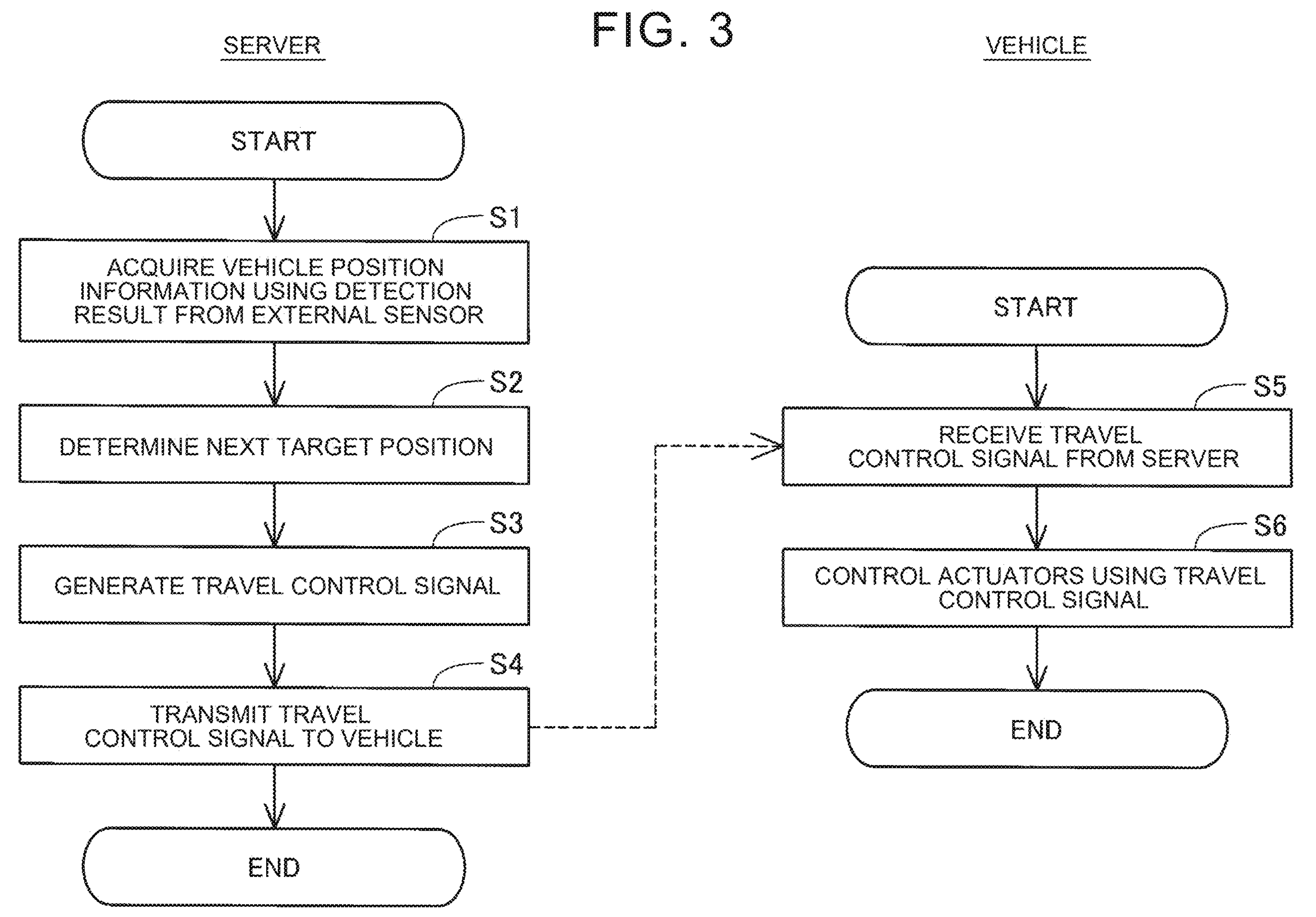
FIG. 3 is a flowchart illustrating the processing procedure for controlling travel of a vehicle.

FIG. 3 is a flowchart illustrating the processing procedure for controlling travel of the vehicle 100. The process in FIG. 3 is executed by the processor 201 of the server 200 that functions as the position estimation unit 240 and the remote control unit 250 and the processor 111 of the vehicle 100 that functions as the vehicle control unit 115. The process illustrated in FIG. 3 is executed repeatedly at predetermined time intervals since the time when the vehicle 100 starts traveling through remote control, for example.

In S1, the processor 201 of the server 200 acquires vehicle position information on the vehicle 100 using the detection result output from the external sensor 300. The vehicle position information is position information, based on which a travel control signal is generated. In the present embodiment, the vehicle position information includes the position and the orientation of the vehicle 100 in the global coordinate system GC of the factory FC. Specifically, in S1, the processor 201 acquires vehicle position information using a captured image acquired from the camera as the external sensor 300.

Specifically, in S1, the processor 201 acquires the position of the vehicle 100 by detecting the outer shape of the vehicle 100 from the captured image, calculating the coordinates of measurement points of the vehicle 100 in the coordinate system of the captured image, that is, a local coordinate system, and converting the calculated coordinates into coordinates in the global coordinate system GC. The outer shape of the vehicle 100 included in the captured image can be detected by inputting the captured image to the detection model DM that makes use of artificial intelligence, for example. The detection model DM is prepared inside or outside the system 50, and stored in advance in the memory 202 of the server 200, for example. Examples of the detection model DM include a trained machine learning model that has been trained so as to achieve one of semantic segmentation and instance segmentation, for example. As the machine learning model, a convolutional neural network (hereinafter referred to as a "CNN") trained through supervised learning using a learning data set can be used, for example. The learning data set includes a plurality of training images including the vehicle 100, and a label indicating whether each region in the training images is a region indicating the vehicle 100 or a region indicating an area other than the vehicle 100, for example. During training of the CNN, parameters of the CNN are preferably updated so as to reduce an error between the result output from the detection model DM and the label through back propagation (error back propagation method). In addition, the processor 201 can acquire the orientation of the vehicle 100 by estimating the orientation based on the direction of a movement vector of the vehicle 100 calculated from variations in position of feature points of the vehicle 100 between frames of the captured image using an optical flow method, for example.

In S2, the processor 201 of the server 200 determines a target position for which the vehicle 100 should be bound next. In the present embodiment, the target position is represented by X, Y, and Z coordinates in the global coordinate system GC. The memory 202 of the server 200 stores in advance the reference route RR as a route that should be traveled by the vehicle 100. The route is represented by a node that indicates a departure location, nodes that indicate pass points, a node that indicates a destination location, and links that connect between the nodes. The processor 201 determines the target position for which the vehicle 100 should be bound next using the vehicle position information and the reference route RR. The processor 201 determines the target position on the reference route RR further ahead of the present location of the vehicle 100.

In S3, the processor 201 of the server 200 generates a travel control signal for causing the vehicle 100 to travel toward the determined target position. The processor 201 calculates a travel speed of the vehicle 100 from transitions in position of the vehicle 100, and makes a comparison between the calculated travel speed and a target speed. The processor 201 determines the acceleration such that the vehicle 100 accelerates when the travel speed is lower than the target speed as a whole, and determines the acceleration such that the vehicle 100 decelerates when the travel speed is higher than the target speed.

In addition, the processor 201 determines the steering angle and the acceleration such that the vehicle 100 does not deviate from the reference route RR when the vehicle 100 is positioned on the reference route RR, and determines the steering angle and the acceleration such that the vehicle 100 returns to the reference route RR when the vehicle 100 is not positioned on the reference route RR, or in other words, when the vehicle 100 has deviated from the reference route RR.

In S4, the processor 201 of the server 200 transmits the generated travel control signal to the vehicle 100. The processor 201 acquires a position of the vehicle 100, determines a target position, generates a travel control signal, and transmits the travel control signal repeatedly in predetermined cycles.

In S5, the processor 111 of the vehicle 100 receives the travel control signal transmitted from the server 200. In S6, the processor 111 of the vehicle 100 causes the vehicle 100 to travel with the acceleration and the steering angle represented by the travel control signal by controlling the actuator group 120 using the received travel control signal. The processor 111 receives the travel control signal and controls the actuator group 120 repeatedly in predetermined cycles. With the system 50 according to the present embodiment, the vehicle 100 can be caused to travel through remote control, and the vehicle 100 can be moved without using conveyance equipment such as a crane or a conveyor.

In the present embodiment, the vehicle 100 in the middle of being manufactured travels in the factory FC. The processes executed for the vehicle 100 include a process in which assembly of parts etc. is performed while the vehicle 100 is traveling itself without using a conveyor as discussed earlier. In such a case, travel of the vehicle is controlled such that the travel speed of the vehicle 100 is about the same as the conveyance speed of a conveyor.

When the remote control unit 250 generates a travel control signal for controlling the actuator group 120 of the vehicle 100, it is necessary to detect the speed of the vehicle 100 during travel. Here, when the travel speed of the vehicle 100 is low, the vehicle speed sensor 140 outputs pulse signals at long intervals. Therefore, the resolution of the pulse signals is low, and the precision in detecting the vehicle speed acquired based on the pulse signals tends to be low.

Therefore, in the present embodiment, a selected one of the first method and the second method is used as a method of acquiring the speed of the vehicle 100.

Figure 4:
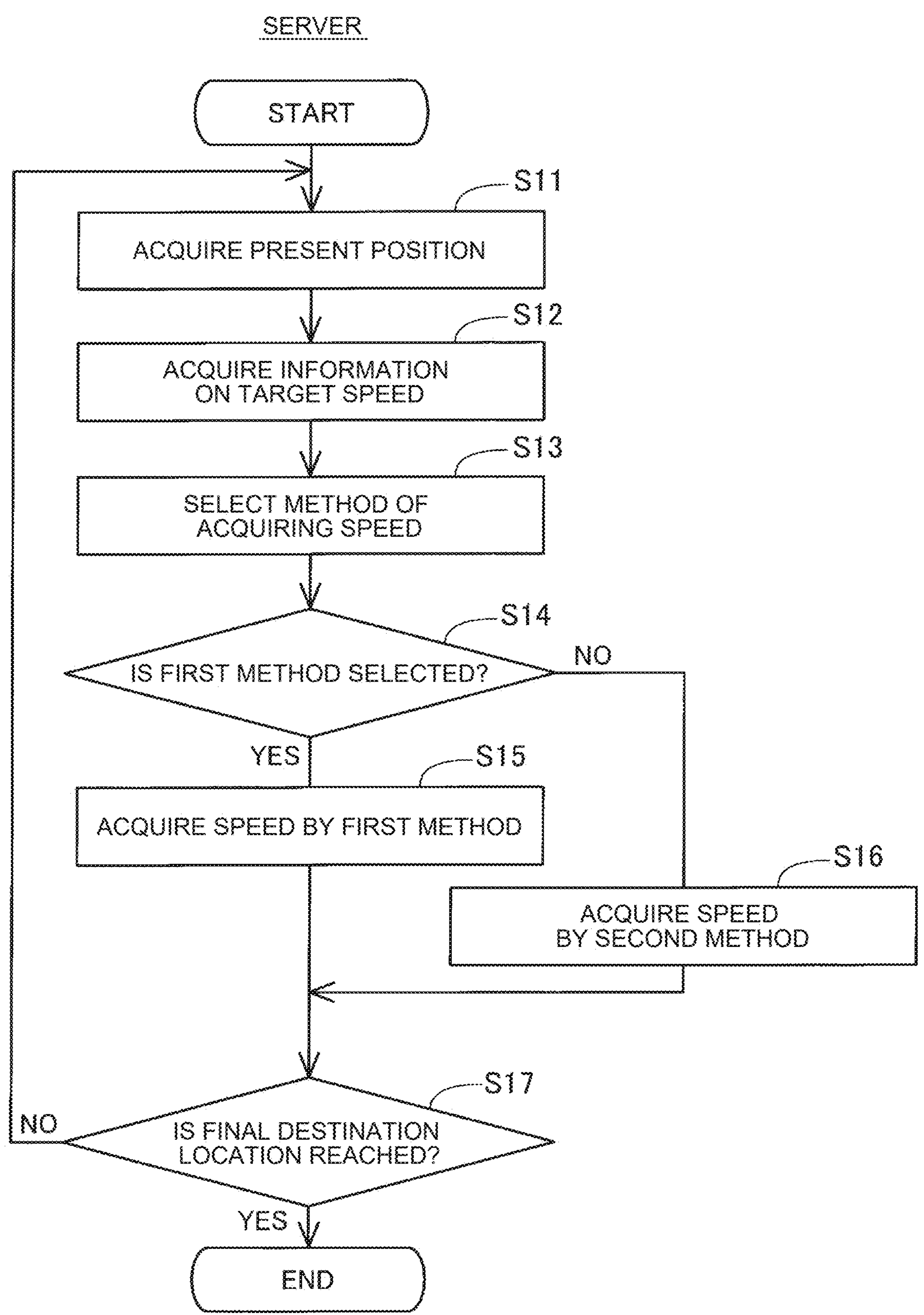
FIG. 4 is a flowchart illustrating the procedure for acquiring the speed of the vehicle.

FIG. 4 is a flowchart illustrating the procedure for acquiring the speed of the vehicle 100. The process illustrated in FIG. 4 is started immediately after the vehicle 100 starts traveling. For example, the process illustrated in FIG. 4 is executed immediately after the vehicle 100 starts traveling after being brought into the form of a platform that is capable of unattended travel through the process performed at the first location PL1. The process illustrated in FIG. 4 is executed by the processor 201 that functions as the selection unit 210, the speed acquisition unit 230, and the position estimation unit 240.

In S11, the processor 201 specifies the present position of the vehicle 100. Here, the processor 201 acquires process information that represents the present process in which the vehicle 100 is positioned, in order to specify the present position of the vehicle 100. For example, the processor 201 acquires process information that represents the process in which the vehicle 100 is positioned from a higher-level server (not illustrated). After each process is performed, a worker outputs a notification of the completion of the process to the higher-level server using a terminal device, for example. Hence, the processor 201 can inquire of the higher-level server the present process in which the vehicle 100 is positioned. Alternatively, the processor 201 may estimate the position of the vehicle 100 using a detection result output from the external sensor 300, in order to specify the present position of the vehicle 100. Alternatively, the processor 201 may specify the present position of the vehicle 100 using the process information supplied from the higher-level server and the detection result output from the external sensor 300.

In S12, the processor 201 acquires information on the target speed for the vehicle 100. The target speed is a travel speed that should be maintained when the vehicle 100 travels at the present position. For example, the processor 201 can acquire a target speed as the travel speed that should be maintained by the vehicle 100 at each location of the travel route to the destination location based on a speed profile. The speed profile prescribes the travel speed that should be maintained by the vehicle 100 at each location of the travel route to the destination location. The speed profile is stored in advance in the memory 202. The processor 201 acquires information on the target speed at the present position based on the speed profile. It is assumed that the vehicle 100 is controlled so as to travel while maintaining the target speed.

In S13, the processor 201 selects one of the first method and the second method as the method of acquiring the speed of the vehicle 100. As discussed earlier, the first method is a method of acquiring the speed of the vehicle 100 using a detection value from the vehicle speed sensor 140. The second method is a method of acquiring the speed of the vehicle 100 using the rotational speed of the output shaft of the drive motor of the vehicle 100 as information about the rotational speed of the drive motor provided in the vehicle 100.

In the present embodiment, the first method is selected when the target speed acquired in S12 is equal to or more than a predetermined threshold. Meanwhile, the second method is selected when the target speed acquired in S12 is less than the predetermined threshold. The predetermined threshold may be 5 kilometers per hour, for example. It is assumed that the vehicle 100 travels at a low speed when the target speed is less than the predetermined threshold. When the target speed is in the range of less than the predetermined threshold, the reliability of the travel speed of the vehicle 100 calculated using pulse signals output from the vehicle speed sensor 140 is low. The term "low speed" refers to a speed at which the reliability of the travel speed of the vehicle 100 calculated using pulse signals output from the vehicle speed sensor 140 is less than a predetermined criterion. The predetermined threshold is set based on the speed at which the reliability of the travel speed of the vehicle 100 calculated using pulse signals output from the vehicle speed sensor 140 is less than the predetermined criterion. Hence, the second method is selected when the target speed is less than the predetermined threshold. Meanwhile, the first method is selected when the target speed is equal to or more than the predetermined threshold. The reliability degree of the detection value from the vehicle speed sensor 140 tends to be higher as the speed of the vehicle 100 is higher. Therefore, the speed of the vehicle 100 can be detected appropriately. A predetermined value to determine whether the reliability degree of the detection value from the vehicle speed sensor 140 is high may be determined in advance. It may be determined whether the reliability degree of the detection value from the vehicle speed sensor 140 is equal to or higher than the predetermined value based on the speed of the vehicle 100 according to the relationship the reliability degree of the detection value from the vehicle speed sensor 140 and the speed of the vehicle 100.

When the first method is selected in S14 (S14: YES), the process in S15 is executed. On the other hand, when the first method is not selected, that is, when the second method is selected (S14: NO), the process in S16 is executed.

In S15, the processor 201 acquires the speed of the vehicle 100 using the first method. The processor 201 acquires the travel speed calculated based on pulse signals from the vehicle speed sensor 140 and transmitted from the vehicle control unit 115 as the travel speed of the vehicle 100. The acquired travel speed of the vehicle 100 is used to generate a travel control signal (see S3 in FIG. 3).

In S16, the processor 201 acquires the speed of the vehicle 100 using the second method. The processor 201 acquires the rotational speed of the output shaft of the drive motor transmitted from the vehicle control unit 115. Further, the processor 201 calculates the travel speed of the vehicle 100 using the acquired rotational speed of the output shaft of the drive motor. The acquired travel speed of the vehicle 100 is used to generate a travel control signal (see S3 in FIG. 3). In this manner, the server 200 can acquire the precise speed of the vehicle 100 in real time in S15 or S16.

When the vehicle 100 has not reached the final destination location (S17: NO), the process in S11 is executed again. When the vehicle 100 has reached the final destination location (S17: YES), the process in FIG. 4 is ended.

In the present embodiment, when the reliability degree of the detection value from the vehicle speed sensor 140 is not high, the vehicle speed is acquired using information about the rotational speed of the electric motor. Examples of the case where the reliability degree of the detection value from the vehicle speed sensor 140 is not high include a case where the vehicle 100 is traveling at a low speed. When the target speed for the vehicle 100 at the present position is low, the vehicle speed is acquired using information about the rotational speed of the drive motor. When the reliability degree of the detection value from the vehicle speed sensor 140 is high, meanwhile, the vehicle speed is acquired using the detection value from the vehicle speed sensor 140.

As discussed earlier, when the travel speed of the vehicle 100 is low, the resolution of pulse signals output from the vehicle speed sensor 140 is low. Therefore, the precision in detecting the vehicle speed acquired based on the pulse signals tends to be low. When the travel speed of the vehicle 100 is not low, on the other hand, the precision of the speed acquired based on the pulse signals output from the vehicle speed sensor 140 is higher than the precision of the speed acquired using information about the rotational speed of the drive motor. This is because the vehicle speed sensor 140 directly reads rotation of a wheel of the vehicle 100. In the method of acquiring the speed based on the rotational speed of the drive motor, rotation of a wheel of the vehicle 100 is not directly detected. The rotational speed of the drive motor may include uncertain factors due to backlash or rattle caused in gears of the vehicle 100, shift changes, neutral range, the difference in rotation between the right and left tires during a turn, etc., for example. Therefore, in the present embodiment, the vehicle speed is acquired using information about the rotational speed of the drive motor in limited scenes in which the vehicle 100 travels at a low speed such as when the vehicle 100 in the middle of being manufactured travels at about the same speed as the conveyance speed of a conveyor etc. and when the reliability degree of the detection value from the vehicle speed sensor 140 is not high.

As has been described above, the reliability degree of the detection of the vehicle speed can be secured both when the vehicle is traveling at a low speed and when the vehicle is not traveling at a low speed. In this manner, it is selected according to the status about the speed of the vehicle 100 which of the detection value from the vehicle speed sensor 140 and the information about the rotational speed of the drive motor is used in order to acquire the speed of the vehicle 100. For this reason, the vehicle speed can be detected appropriately both when the vehicle is traveling at a low speed and when the vehicle is not traveling at a low speed.

B. Second Embodiment

Figure 5:
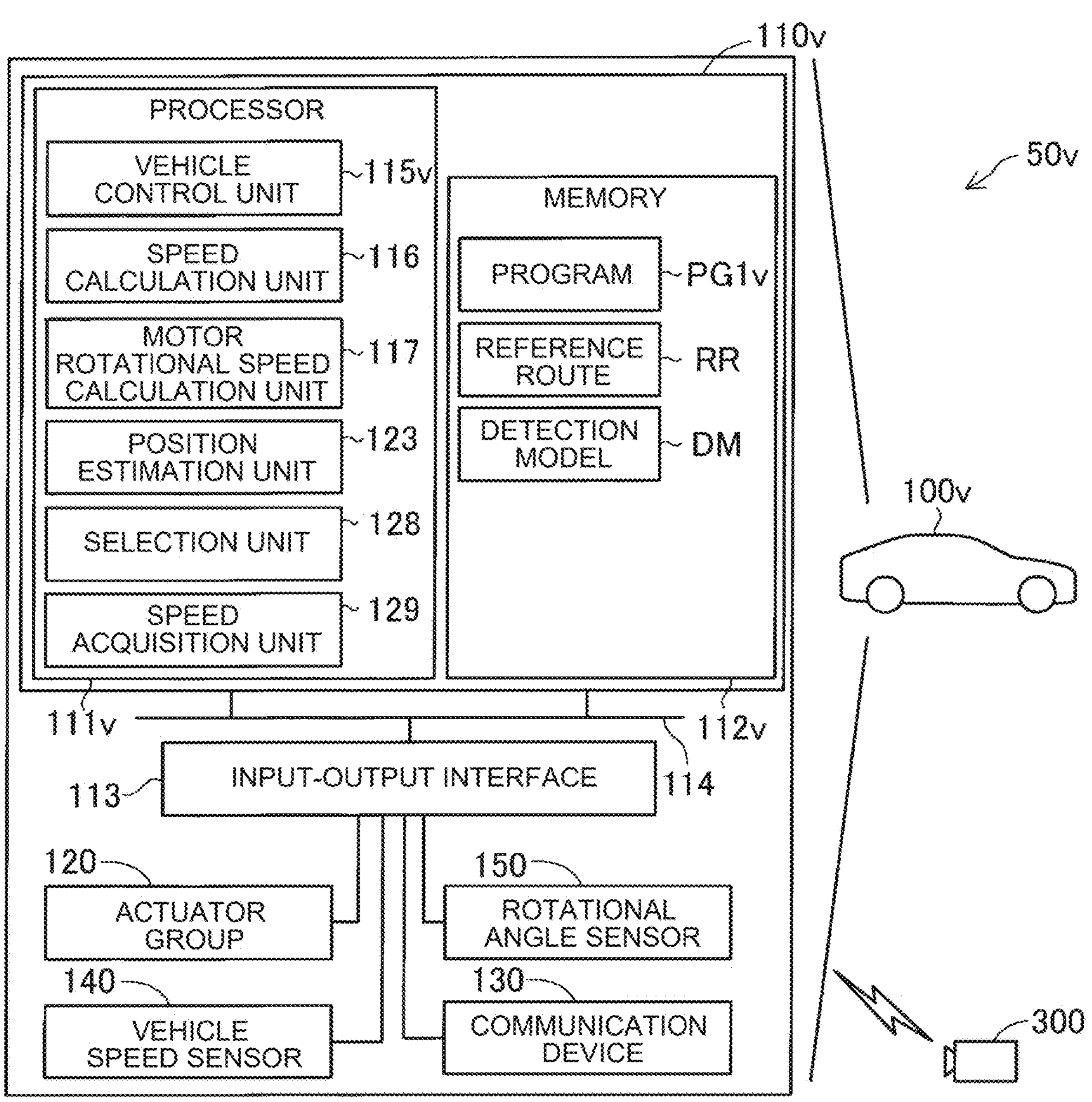
FIG. 5 illustrates a schematic configuration of a system according to a second embodiment.

FIG. 5 illustrates a schematic configuration of a system **50*v* according to a second embodiment. The present embodiment is different from the first embodiment in that the system 50*v* does not include the server 200. A vehicle 100*v* according to the present embodiment can travel through autonomous control for the vehicle 100*v*. The other configuration is the same as the first embodiment unless otherwise specified. A vehicle control device 110*v* is constituted by a computer that includes a processor 111*v*, a memory 112*v*, an input-output interface 113, and an internal bus 114**. In the following, the configuration different from the first embodiment will be mainly described, and the configuration similar to the first embodiment will be omitted.

The memory **112*v*** stores in advance a program PG1*v*, a reference route RR that indicates a route that should be traveled by the vehicle **100*v***, a detection model DM, etc.

In the present embodiment, the processor **111*v* of the vehicle control device 110*v* functions as a vehicle control unit 115*v*, the speed calculation unit 116, the motor rotational speed calculation unit 117, the position estimation unit 123, the selection unit 128, and the speed acquisition unit 129** by executing the program PG1*v* stored in the memory **112*v***.

The position estimation unit 123 estimates the position and the orientation of the vehicle **100*v* using a detection result output from the external sensor 300. The communication device 130 can communicate with the external sensors 300 through wired communication or wireless communication. Alternatively, the position estimation unit 123 may estimate only one of the position and the orientation of the vehicle 100*v* using the detection result output from the external sensor 300. In this case, the other of the position and the orientation of the vehicle 100*v* is determined using a travel history etc. of the vehicle 100*v***, for example.

The vehicle control unit **115*v* can cause the vehicle 100*v* to travel through autonomous control, by causing the actuator group 120** to operate by acquiring output results from the sensors, generating a travel control signal using the output results, and outputting the generated travel control signal.

The functions of the speed calculation unit 116 and the motor rotational speed calculation unit 117 are the same as those according to the first embodiment.

The selection unit 128 selects which one of the first method and the second method is used as a method of acquiring the speed of the vehicle **100*v*, as with the selection unit 210** according to the first embodiment. The first method and the second method are the same as those according to the first embodiment.

The speed acquisition unit 129 acquires the speed of the vehicle **100*v* by the method selected by the selection unit 128, as with the speed acquisition unit 230** according to the first embodiment.

Figure 6:
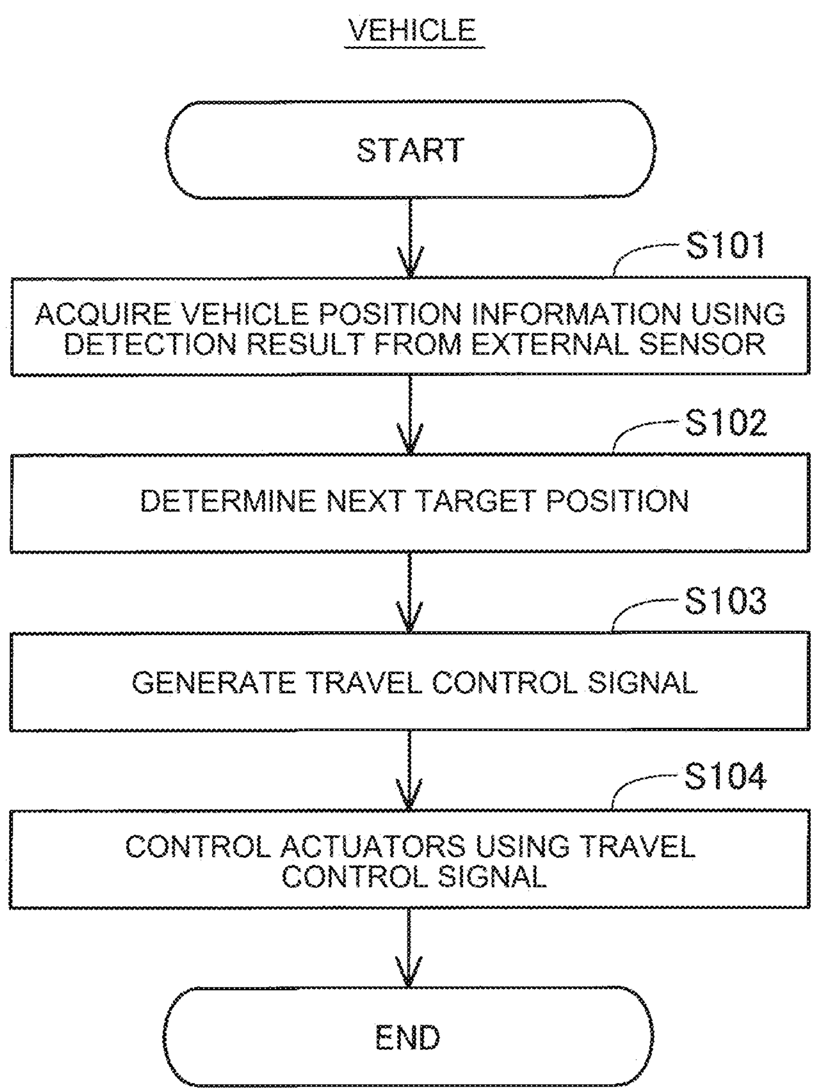
FIG. 6 is a flowchart illustrating the processing procedure for controlling travel of a vehicle according to the second embodiment.

FIG. 6 is a flowchart illustrating the processing procedure for controlling travel of the vehicle **100*v* according to the second embodiment. The processor 111*v* that functions as the position estimation unit 123 and the vehicle control unit 115*v* executes the process in FIG. 6**.

In S101, the processor **111*v* acquires vehicle position information using the detection result output from the camera as the external sensor 300. In S102, the processor 111*v* determines a target position for which the vehicle 100*v* should be bound next. In S103, the processor 111*v* generates a travel control signal for causing the vehicle 100*v* to travel toward the determined target position. In S104, the processor 111*v* causes the vehicle 100*v* to travel according to the parameters represented by the travel control signal, by controlling the actuator group 120 using the generated travel control signal. The processor 111*v* acquires vehicle position information, determines a target position, generates a travel control signal, and controls the actuators repeatedly in predetermined cycles. With the system 50*v* according to the present embodiment, the vehicle 100*v* can be caused to travel through autonomous control for the vehicle 100***v* even if the vehicle 100*v* is not remotely controlled by the server 200.

Figure 7:
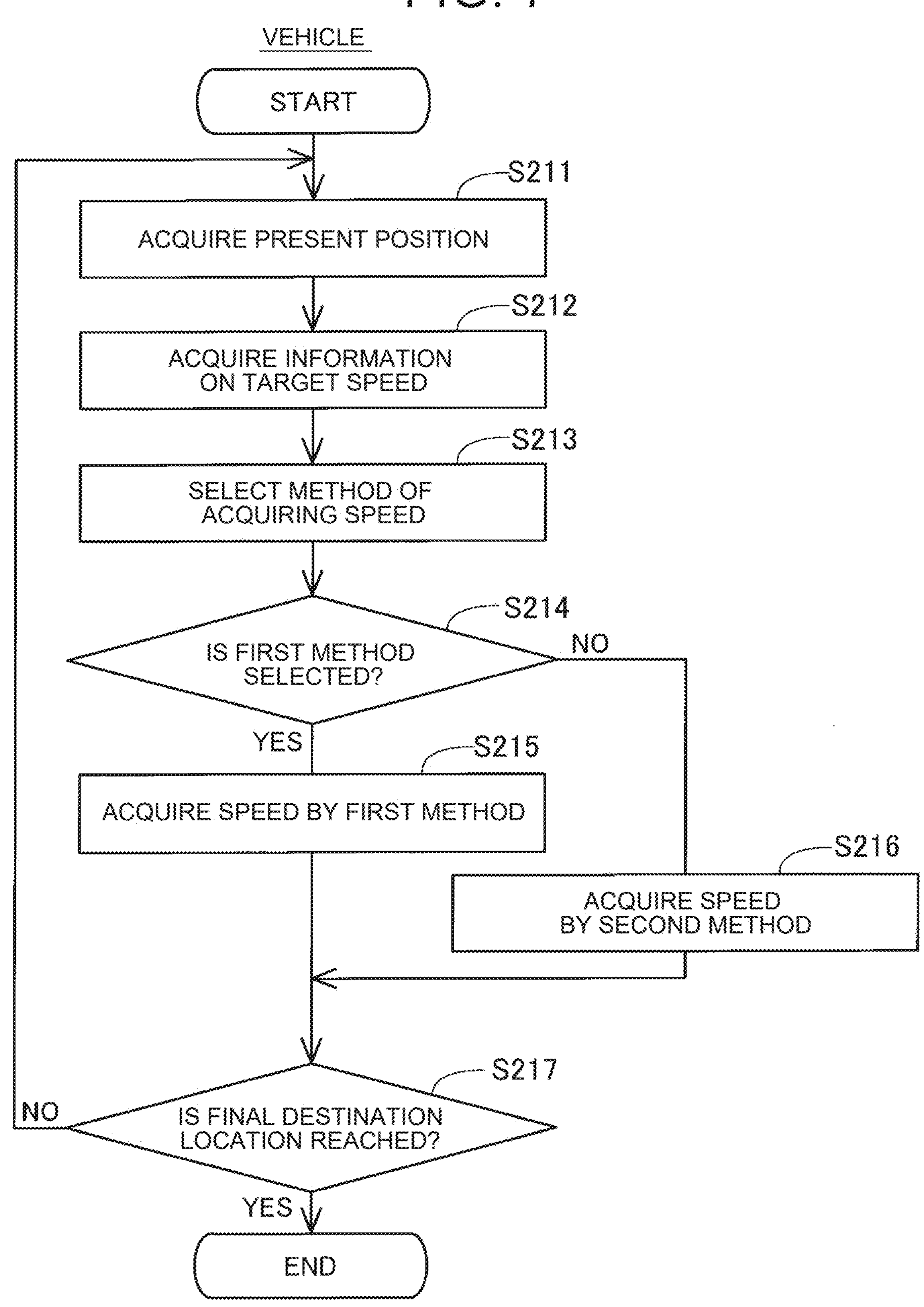
FIG. 7 is a flowchart illustrating the procedure for acquiring the speed of the vehicle according to the second embodiment.

FIG. 7 is a flowchart illustrating the procedure for acquiring the speed of the vehicle 100*v*. The process illustrated in FIG. 7 is started immediately after the vehicle 100*v* starts traveling. For example, the process illustrated in FIG. 7 is executed immediately after the vehicle 100*v* starts traveling after being brought into the form of a platform that is capable of unattended travel through the process performed at the first location PL1. The process illustrated in FIG. 7 is executed by the processor 111*v* that functions as the selection unit 128, the speed acquisition unit 129, and the position estimation unit 123.

In S211, the processor 111*v* specifies the present position of the vehicle 100*v*. Here, the processor 111*v* acquires process information that represents the present process in which the vehicle 100*v* is positioned, in order to specify the present position of the vehicle 100*v*. For example, the processor 111*v* acquires process information that represents the process in which the vehicle 100*v* is positioned from a higher-level server (not illustrated). Alternatively, the processor 111*v* may estimate the position of the vehicle 100*v* using a detection result output from the external sensors 300, in order to specify the present position of the vehicle 100*v*. Alternatively, the processor 111*v* may specify the present position of the vehicle 100*v* using the process information supplied from the higher-level server and the detection result output from the external sensor 300.

In S212, the processor 111*v* acquires information on the target speed for the vehicle 100*v*. For example, the processor 111*v* acquires information on the target speed at the present position based on the speed profile. The speed profile is stored in advance in the memory 112*v*.

In S213, the processor 111*v* selects one of the first method and the second method as the method of acquiring the speed of the vehicle 100*v*.

In the present embodiment, the processor 111*v* determines whether the travel speed is limited in the present process in which the vehicle 100*v* is positioned using the process information acquired in S211. It is assumed that the process information includes not only information that represents the process in which the vehicle 100*v* is positioned, but also information as to whether the travel speed is limited in the relevant process. When the travel speed is limited, it is indicated that the vehicle 100*v* must travel at a predetermined speed or lower. For example, the travel speed of the vehicle 100*v* is limited when a plurality of workers assemble a plurality of parts to the vehicle 100*v* in the relevant process. The predetermined speed may be 3 kilometers per hour, for example. It is assumed that the vehicle 100*v* travels at a low speed when the travel speed of the vehicle 100*v* is limited. The predetermined speed is set based on the speed at which the reliability of the travel speed of the vehicle 100*v* calculated using pulse signals output from the vehicle speed sensor 140 is less than the predetermined criterion. The processor 111*v* selects the second method as the method of acquiring the speed of the vehicle 100*v* when the travel speed is limited in the present process in which the vehicle 100*v* is positioned. When the vehicle 100*v* is traveling at a low speed, the reliability of the travel speed of the vehicle 100*v* calculated using pulse signals output from the vehicle speed sensor 140 is low. Hence, the second method is selected. Meanwhile, the processor 111*v* selects the first method as the method of acquiring the speed of the vehicle 100*v* when the travel speed is not limited in the present process in which the vehicle 100*v* is positioned.

When the first method is selected in S214 (S214: YES), the process in S215 is executed. On the other hand, when the first method is not selected, that is, when the second method is selected (S214: NO), the process in S216 is executed.

In S215, the processor 111*v* acquires the speed of the vehicle 100*v* using the first method. The processor 111*v* acquires the travel speed calculated based on pulse signals output from the vehicle speed sensor 140 as the travel speed of the vehicle 100*v*. The acquired travel speed of the vehicle 100*v* is used to generate a travel control signal (see S103 in FIG. 6).

In S216, the processor 111*v* acquires the speed of the vehicle 100*v* using the second method. The processor 111*v* calculates the travel speed of the vehicle 100*v* using the rotational speed of the output shaft of the drive motor calculated from the rotational angle of the drive motor output from the rotational angle sensor 150. The acquired travel speed of the vehicle 100*v* is used to generate a travel control signal (see S103 in FIG. 6).

When the vehicle 100*v* has not reached the final destination location (S217: NO), the process in S211 is executed again. When the vehicle 100*v* has reached the final destination location (S217: YES), the process in FIG. 7 is ended.

As has been described above, in the present embodiment, it is assumed that the vehicle 100*v* travels at a low speed when the travel speed of the vehicle 100*v* is limited. In this case, it is considered that the reliability degree of the detection value from the vehicle speed sensor 140 is low. In this case, the vehicle speed is acquired using information about the rotational speed of the electric motor. When the travel speed of the vehicle 100*v* at the present position is limited, the vehicle speed is acquired using information about the rotational speed of the drive motor. When the travel speed of the vehicle 100*v* at the present position is not limited, meanwhile, the travel speed of the vehicle is not low. In this case, the reliability degree of the detection value from the vehicle speed sensor 140 is high, and thus the vehicle speed is acquired using the detection value from the vehicle speed sensor 140. Therefore, the reliability degree of the detection of the vehicle speed can be secured both when the vehicle is traveling at a low speed and when the vehicle is not traveling at a low speed. In this manner, it is selected according to the status about the speed of the vehicle 100*v* which of the detection value from the vehicle speed sensor 140 and the information about the rotational speed of the drive motor is used in order to acquire the speed of the vehicle 100*v*. Therefore, the vehicle speed can be detected appropriately both when the vehicle is traveling at a low speed and when the vehicle is not traveling at a low speed.

C. Other Embodiments (C1) In the first embodiment, the first method is selected on condition that the target speed for the vehicle 100 is equal to or more than a predetermined threshold. In the second embodiment, meanwhile, the first method is selected on condition that the travel speed is not limited in the process in which the vehicle 100 is positioned. However, the condition for selecting the first method is not limited thereto.

For example, when a failure occurs in another vehicle that travels around the vehicle 100 in a configuration in which the server 200 remotely controls drive of the vehicle 100, the server 200 occasionally controls the travel speed of the vehicle 100 to a low speed for a certain period of time since the occurrence of the failure. The second method may be selected as the method of acquiring the speed of the vehicle 100 while the vehicle is controlled so as to travel at a low speed in this manner. It is considered that a worker has completed the work of recovering the other vehicle in which the failure has occurred, for example, when the certain period of time has elapsed since the occurrence of the failure. Therefore, the server 200 controls the vehicle 100 so as to travel at the speed before being changed to the low speed again. In this case, the first method is selected as the method of acquiring the speed of the vehicle 100.

(C2) In the first embodiment, the first method is selected on condition that the target speed is equal to or more than a predetermined threshold. Even when the target speed is equal to or more than the predetermined threshold, however, it is assumed that a certain period of time is required since the vehicle 100 starts traveling until the travel speed of the vehicle 100 reaches the target speed, for example. Hence, the second method may be selected since the vehicle 100 starts traveling until a predetermined period of time elapses. The second method may be selected after the predetermined period of time elapses since the vehicle 100 starts traveling.

(C3) In the first embodiment and the second embodiment, when the second method is selected, the control value for controlling the unattended operation of the vehicle 100 may include at least a target value for the vehicle speed. When the speed of the vehicle 100 is significantly low, it is only necessary to control the electric motor so as to reach the target value for the speed, and it is not necessary to perform control in consideration of the acceleration of the vehicle 100.

(C4) In the first embodiment and the second embodiment, when the first method is selected, meanwhile, the control value for controlling the unattended operation of the vehicle 100 may include at least a target value for the acceleration of the vehicle 100.

Acceleration in the front-rear direction and acceleration in the right-left direction are applied to the vehicle by disturbances due to the travel environment of the vehicle 100. When the speed of the vehicle 100 is equal to or more than a predetermined speed, variations in the acceleration in the front-rear direction and the acceleration in the right-left direction tend to be large. Therefore, travel of the vehicle 100 may be made unstable by the variations in the acceleration in the front-rear direction and the acceleration in the right-left direction. Hence, travel of the vehicle 100 can be finely controlled by controlling the acceleration of the vehicle 100.

(C5) In the above embodiments, the external sensors 300 are cameras. On the contrary, the external sensors 300 may not be cameras, and may be light detection and ranging sensors (LiDARs), for example. In this case, the detection results output from the external sensors 300 may be three-dimensional point cloud data that represent the vehicle 100. In this case, the server 200 and the vehicle 100 may acquire vehicle position information through template matching in which the three-dimensional point cloud data as the detection results and reference point cloud data prepared in advance are used.

(C6) In the first embodiment, the server 200 executes processes from the acquisition of vehicle position information to the generation of a travel control signal. On the contrary, the vehicle 100 may execute at least a part of the processes from the acquisition of vehicle position information to the generation of a travel control signal. For example, the following aspects (1) to (3) may be used.

(1) The server 200 may acquire vehicle position information, determine a target position for which the vehicle 100 should be bound next, and generate a route from a present location of the vehicle 100 represented by the acquired vehicle position information to the target position. The server 200 may generate a route to the target position between the present location and a destination location, or may generate a route to the destination location. The server 200 may transmit the generated route to the vehicle 100. The vehicle 100 may generate a travel control signal such that the vehicle 100 travels on the route received from the server 200, and control the actuator group 120 using the generated travel control signal.

(2) The server 200 may acquire vehicle position information, and transmit the acquired vehicle position information to the vehicle 100. The vehicle 100 may determine a target position for which the vehicle 100 should be bound next, generate a route from a present location of the vehicle 100 represented by the received vehicle position information to the target position, generate a travel control signal such that the vehicle 100 travels on the generated route, and control the actuator group 120 using the generated travel control signal.

(3) In the above aspects (1) and (2), an internal sensor may be mounted on the vehicle 100, and a detection result output from the internal sensor may be used in at least one of the generation of a route and the generation of a travel control signal. The internal sensor is a sensor mounted on the vehicle 100. Examples of the internal sensor may include a sensor that detects the kinetic state of the vehicle 100, a sensor that detects the operation state of various portions of the vehicle 100, and a sensor that detects the environment around the vehicle 100. Specific examples of the internal sensor may include a camera, a LiDAR, a millimeter wave radar, an ultrasonic sensor, a Global Positioning System (GPS) sensor, an acceleration sensor, and a gyro sensor. For example, in the above aspect (1), the server 200 may acquire a detection result from the internal sensor, and reflect the detection result from the internal sensor in a route when generating a route. In the above aspect (1), the vehicle 100 may acquire a detection result from the internal sensor, and reflect the detection result from the internal sensor in a travel control signal when generating a travel control signal. In the above aspect (2), the vehicle 100 may acquire a detection result from the internal sensor, and reflect the detection result from the internal sensor in a route when generating a route. In the above aspect (2), the vehicle 100 may acquire a detection result from the internal sensor, and reflect the detection result from the internal sensor in a travel control signal when generating a travel control signal.

(C7) In the above second embodiment, an internal sensor may be mounted on the vehicle **100*v*, and a detection result output from the internal sensor may be used in at least one of the generation of a route and the generation of a travel control signal. For example, the vehicle 100*v* may acquire a detection result from the internal sensor, and reflect the detection result from the internal sensor in a route when generating a route. The vehicle 100*v*** may acquire a detection result from the internal sensor, and reflect the detection result from the internal sensor in a travel control signal when generating a travel control signal.

(C8) In the above second embodiment, the vehicle **100*v* acquires vehicle position information using a detection result from the external sensor 300. On the contrary, an internal sensor may be mounted on the vehicle 100*v*, and the vehicle 100*v* may acquire vehicle position information using a detection result from the internal sensor, determine a target position for which the vehicle 100*v* should be bound next, generate a route from a present location of the vehicle 100$v$ represented by the acquired vehicle position information to the target position, generate a travel control signal for traveling along the generated route, and control the actuator group 120 using the generated travel control signal. In this case, the vehicle 100$v$ can travel without using a detection result from the external sensor 300 at all. The vehicle 100$v$ may acquire a target arrival time and traffic congestion information from the outside of the vehicle 100$v$, and reflect the target arrival time or the traffic congestion information in at least one of a route and a travel control signal. All the functional components of the system 50$v$ may be provided in the vehicle 100$v$. That is, the processes implemented by the system 50$v$ in the present disclosure may be implemented by the vehicle 100**$v$ alone.

(C9) The vehicle 100 may be manufactured by combining a plurality of modules. The modules each mean a unit composed of a plurality of parts grouped according to the area or the function in the vehicle 100. For example, the platform of the vehicle 100 may be manufactured by combining a front module that constitutes a front part of the platform, a center module that constitutes a center part of the platform, and a rear module that constitutes a rear part of the platform. The number of modules that constitute the platform is not limited to three, and may be two or less or four or more. The modules may include a part that constitutes a portion of the vehicle 100 that is different from the platform, in addition to or in place of the parts that constitute the platform. The various modules may include any exterior part such as a grille, or any interior part such as a seat or a console. Not only the vehicle 100 but also mobile bodies in any aspect may be manufactured by combining a plurality of modules. Such modules may be manufactured by joining a plurality of parts by welding, using a fixture, etc., or may be manufactured by integrally molding at least a part of parts that constitute a module as a single part by casting, for example. The method of integrally molding a single component, in particular a relatively large component, is called gigacasting or megacasting. For example, the front module, the center module, and the rear module described above may be manufactured by gigacasting.

(C10) Conveying the vehicle 100 using travel of the vehicle 100 through unattended operation is called "self-propelled conveyance". The configuration for implementing the self-propelled conveyance is called a "vehicle remote control autonomous travel conveyance system". The method of producing the vehicle 100 using the self-propelled conveyance is called "self-propelled production". In the self-propelled production, at least a part of conveyance of the vehicle 100 in the factory FC where vehicles 100 are manufactured is implemented through self-propelled conveyance, for example.

(C11) In the above embodiments, a part or all of the functions and the processes implemented by software may be implemented by hardware. In addition, a part or all of the functions and the processes implemented by hardware may be implemented by software. Examples of the hardware that implements the various functions in the above embodiments may include various circuits such as integrated circuits and discrete circuits.

The present disclosure is not limited to the above embodiments, and can be implemented by a variety of configurations without departing from the spirit of the present disclosure. For example, the technical features in the embodiments corresponding to the technical features in the aspects described in "SUMMARY" can be replaced or combined, as appropriate, in order to address the above issue or achieve some or all of the above effects. When the technical features are not described as essential herein, such technical features can be omitted as appropriate.

What is claimed is:

1. A monitoring system configured to monitor a vehicle that travels through unattended operation using an electric motor as a power source, comprising:
- a camera that captures an image;
- a selection unit configured to:
  - select which one of a first method and a second method to use to acquire a speed of the vehicle according to a status about the speed of the vehicle, the first method acquiring the speed of the vehicle using a detection value from a vehicle speed sensor that makes an output in synchronization with rotation of a wheel of the vehicle the second method of acquiring the speed of the vehicle using information about a rotational speed of the electric motor provided in the vehicle,
  - select the first method if a predetermined condition indicating that a reliability degree of the detection value from the vehicle speed sensor is equal to or higher than a predetermined value is met, and
  - select the second method if the predetermined condition is not met, and
- a speed acquisition unit configured to acquire the speed of the vehicle using the first method or the second method selected by the selection unit;
- a communication device mounted outside the vehicle that periodically receives the detection value from the vehicle speed sensor and the rotational speed of the electric motor from the vehicle; and
- a processor mounted in the vehicle that is configured to:
  - if the first method is selected, set a control value for controlling the unattended operation of the vehicle that includes at least a target value for acceleration of the vehicle, and drive the vehicle based on the first control value, and
  - if the second method is selected, set a control value for controlling the unattended operation of the vehicle that includes at least a target value for the speed of the vehicle, and drive the vehicle based on the second control value, and
- wherein the vehicle is configured to travel in a factory in which a plurality of manufacturing processes is executed in order to manufacture the vehicle,
- wherein the predetermined condition includes a travel speed of the vehicle being not limited in a present manufacturing process for the vehicle,
- wherein the monitoring system acquires a position of the vehicle by detecting an outer shape of the vehicle from the image, calculates coordinates of measurement points of the vehicle, and converts the calculated coordinates into coordinates in a global coordinate system, and
- wherein the outer shape of the vehicle included in the image is detected by inputting the image into a machine learning model and obtaining the outer shape from the machine learning model.

2. The monitoring system according to claim 1, wherein the predetermined condition involves indicating that the detection value from the vehicle speed sensor is equal to or more than a predetermined speed.

3. The monitoring system according to claim 1, further comprising a position estimation unit configured to estimate a position of the vehicle using a detection result output from an external sensor that is positioned outside the vehicle and that images the vehicle.

4. The monitoring system according to claim 1, wherein when a failure occurs in another vehicle that travels around the vehicle while the processor controls drive of the vehicle, the processor controls a speed of the vehicle to a lower speed for a period of time since an occurrence of the failure, and the selection unit is configured to select the second method as the method of acquiring the speed of the vehicle.

5. A monitoring system configured to monitor a vehicle that travels through unattended operation using an electric motor as a power source, comprising:

a selection unit configured to:

select which one of a first method and a second method to use to acquire a speed of the vehicle according to a status about the speed of the vehicle, the first method acquiring the speed of the vehicle using a detection value from a vehicle speed sensor that makes an output in synchronization with rotation of a wheel of the vehicle, and the second method acquiring the speed of the vehicle using information about a rotational speed of the electric motor provided in the vehicle, select the first method if a predetermined condition indicating that a reliability degree of the detection value from the vehicle speed sensor is equal to or higher than a predetermined value is met, and select the second method if the predetermined condition is not met, and a speed acquisition unit configured to acquire the speed of the vehicle using the first method or the second method selected by the selection unit;

a communication device mounted outside of the vehicle that periodically receives the detection value from the vehicle speed sensor and the rotational speed of the electric motor from the vehicle; and a processor mounted in the vehicle that is configured to:

if the first method is selected, set a first control value for controlling the unattended operation of the vehicle that includes at least a target value for acceleration of the vehicle, and drive the vehicle based on the first control value, and if the second method is selected, set a second control value for controlling the unattended operation of the vehicle that includes at least a target value for the speed of the vehicle, and drive the vehicle based on the second control value, and wherein the vehicle is configured to drive in a factory in which a plurality of manufacturing processes is executed in order to manufacture the vehicle, wherein the predetermined condition includes a travel speed of the vehicle being not limited in a present manufacturing process for the vehicle, and wherein when a failure occurs in another vehicle that travels around the vehicle while the processor controls drive of the vehicle, the processor controls a speed of the vehicle to a lower speed for a period of time since an occurrence of the failure, and the selection unit is configured to select the second method as the method of acquiring the speed of the vehicle, based on the speed of the vehicle being set to the lower speed.

6. The monitoring system according to claim 5, wherein the predetermined condition involves indicating that the detection value from the vehicle speed sensor is equal to or more than a predetermined speed.

7. The monitoring system according to claim 5, further comprising a position estimation unit configured to estimate a position of the vehicle using a detection result output from an external sensor that is positioned outside the vehicle and that images the vehicle.

8. The monitoring system according to claim 5, further comprising a camera that captures an image, wherein the monitoring system acquires a position of the vehicle by detecting an outer shape of the vehicle from the image, calculates coordinates of measurement points of the vehicle, and converts the calculated coordinates into coordinates in a global coordinate system, and wherein the outer shape of the vehicle included in the image is detected by inputting the image into a machine learning model and obtaining the outer shape from the machine learning model.

* * * * *